United States Patent [19]

Hillen et al.

[11] Patent Number: 4,975,935
[45] Date of Patent: Dec. 4, 1990

[54] METHOD OF PRODUCING AN X-RAY EXPOSURE BY MEANS OF A PHOTOCONDUCTOR AND ARRANGEMENT FOR CARRYING OUT THE METHOD

[75] Inventors: Walter Hillen, Aachen; Stephan Rupp, Stolberg-Breinig; Ulrich Schiebel, Aachen; Ingo Schafer, Hamburg, all of Fed. Rep. of Germany

[73] Assignee: U.S. Philips Corporation, New York, N.Y.

[21] Appl. No.: 450,336

[22] Filed: Dec. 13, 1989

[30] Foreign Application Priority Data

Dec. 17, 1988 [DE] Fed. Rep. of Germany ....... 3842525

[51] Int. Cl.$^5$ .......................... B41M 5/00; G01T 1/24
[52] U.S. Cl. ........................ 378/28; 378/32; 355/208; 355/214; 250/370.09
[58] Field of Search ............... 378/28, 32; 250/327.2, 250/315.3, 307.09; 355/211, 208, 214, 219

[56] References Cited

U.S. PATENT DOCUMENTS

| 4,300,062 | 11/1981 | Marshall, Jr. ................ 307/304 |
| 4,377,742 | 3/1983 | Kawabata et al. ............ 250/204 |
| 4,554,453 | 11/1985 | Feigt et al. .................. 250/327.2 |
| 4,752,944 | 6/1988 | Conrads et al. .............. 378/28 |

FOREIGN PATENT DOCUMENTS 3534768  4/1987  Fed. Rep. of Germany .

Primary Examiner—Janice A. Howell
Assistant Examiner—Kim Chu
Attorney, Agent, or Firm—William Squire

[57] ABSTRACT

The invention relates to a method of producing an X-ray exposure is provided by a photoconductor, which converts X-radiation into a charge pattern, is evenly charged locally before the X-ray exposure, is discharged by the exposure as a function of the intensity of the X-radiation and the surface of which is scanned after the exposure for detecting the charge density, an image value being formed for each image point, corresponding to the discharge at the image point. The measured image values may be falsified by the self-discharge of the photoconductor induced by X-radiation. Since the self-discharge always proceeds in accordance with the same time laws, the self-discharge effects are corrected utilizing the time of the scanning instants, i.e., position in time with respect to the X-ray exposure and the end of the charging of the photoconductor in conjunction with a characteristic discharge function of the photoconductor and a correction factor.

6 Claims, 3 Drawing Sheets

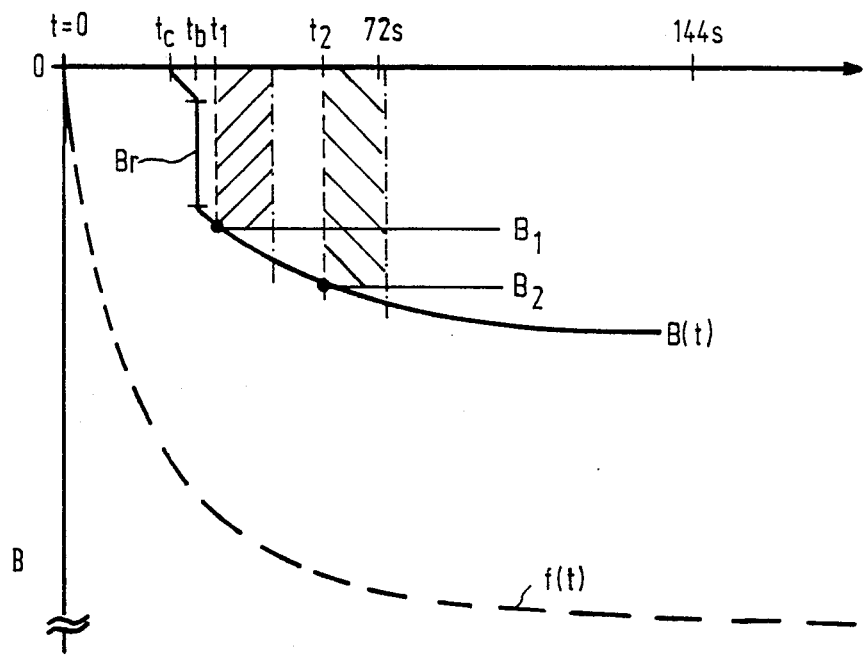
Fig. 4
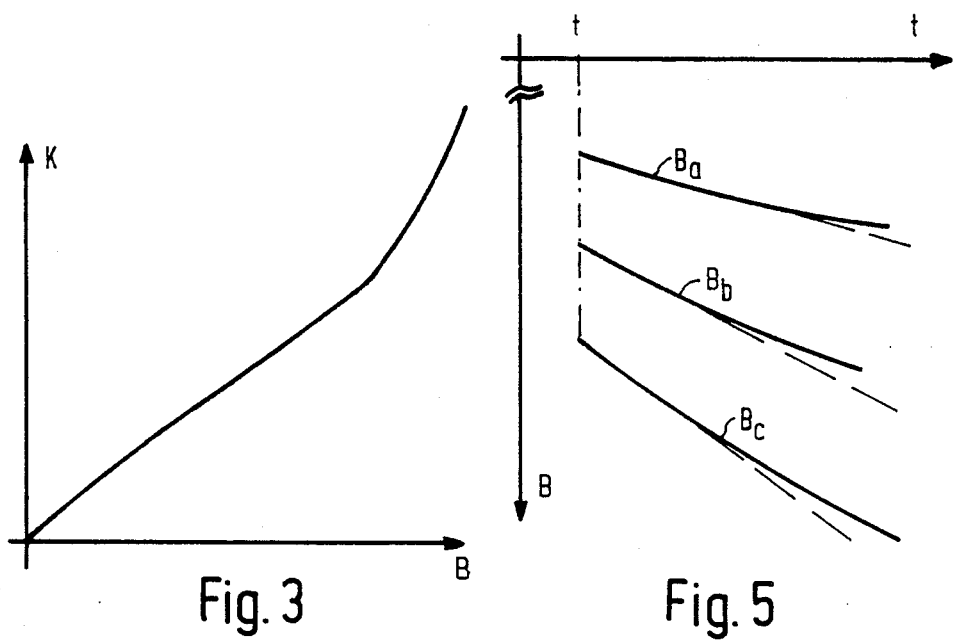
Fig. 3
Fig. 5

METHOD OF PRODUCING AN X-RAY EXPOSURE BY MEANS OF A PHOTOCONDUCTOR AND ARRANGEMENT FOR CARRYING OUT THE METHOD

The invention relates to a method of producing an X-ray exposure by means of a photoconductor, which converts X-radiation into a charge pattern, is evenly charged locally before the X-ray exposure, is discharged by the exposure as a function of the intensity of the X-radiation and the surface of which is scanned after the exposure for detecting the charge density, an image value being formed for each image point, corresponding to the discharge at the image point. Such a method and such an arrangement are described in German Offenlegungsschrift No. 3,534,768.

It has been found that these image values are not, however, only determined by the irradiation which took place during the X-ray exposure, but also by a self-discharge, which depends on the irradiation of the photoconductor. Since not all of the image points are discharged to the same extent, this self-discharge causes artifacts in the X-ray exposure. The object of the invention is to at least reduce these artifacts.

A first effect which leads to such artifacts is the so-called memory effect. This manifests itself, when two X-ray exposures are taken in quick succession, by areas becoming visible in the second exposure which have been affected in the preceding exposure by particularly strong radiation (direct radiation) ("ghost images").

According to the invention, the consequences of this memory effect can be reduced or eliminated by the self-discharge being determined at each image point from the time elapsed since the preceding exposure up to the end of the charging or until reading-out, from the characteristic discharge function of the photoconductor and from an amplitude factor dependent on the dose at the image point concerned in the preceding exposure, and by the associated image value being corrected correspondingly In this case, the variation over time of the discharge of the photoconductor with a dose which can be predetermined at will is referred to as the characteristic discharge function f(t) of the photoconductor. The invention is namely based on the realization that the self-discharge of a certain photoconductor following an X-ray exposure can be represented as the product of a time function which is the same in all cases—the characteristic discharge function f(t) of the photoconductor—and an amplitude factor dependent on the dose in the X-ray exposure. This discharge is relatively strong at first and keeps decreasing as the span of time from the X-ray exposure grows. The self-discharge even takes place if the photoconductor is recharged after the exposure. As long as the charging continues, the surface potential and the charge density on the photoconductor do not change, because the charge carriers disappearing due to the self-discharge are continuously replaced by the charging process. After more than three minutes the self-discharge leads to virtually no change in the surface potential; in the case of X-ray exposures which are taken at intervals of more than three minutes, the memory effect therefore generally no longer makes itself noticeable.

A second self-discharge process takes place following the actual X-ray exposure—irrespective of whether another exposure has already been taken before or not. The extent of this self-discharge depends on the radiation dose by which the individual image points in the X-ray exposure are affected and on the period of time which elapses from the X-ray exposure to the instant at which the charge density is scanned at the image point concerned. Since these parameters are generally different for the different image points, this likewise results in artifacts, which according to the invention can be eliminated by the image values being reduced by an amount which is proportional to the image values and the time difference between the scanning instant and a reference instant, preferably the instant of the exposure, for correction of the discharge brought about by the respective exposure.

In itself, the self-discharge process following the X-ray exposure is the same as described before in conjunction with the memory effect. Since the X-radiation in the areas important for the diagnosis is relatively weak, however, the non-linear line of the characteristic discharge function can be approximated well by a straight line. For the determination of the self-discharge following an exposure, consequently all that is necessary is to reduce each image value proportionally to the time difference between the scanning instant and the end of exposure.

The determination of the parameters which are necessary for correction of the consequences of the memory effect can be performed in various ways:

A first further development of the invention envisages that the amplitude factor is derived from the image value of the preceding exposures. This is conditional on the relationship between image value and dose, which is non-linear in the case of larger doses, being known.

A second further development envisages, on the other hand, that the discharge image produced by a X-ray exposure is scanned twice and that the amplitude factor is determined from the difference of the image values, referred to the difference of the characteristic discharge function f(t) at the two scanning instants. The self-discharge can namely be determined directly from the change in an image value between the two scanning instants.

The invention is explained in more detail below with reference to the drawing, in which.

Figure 6:
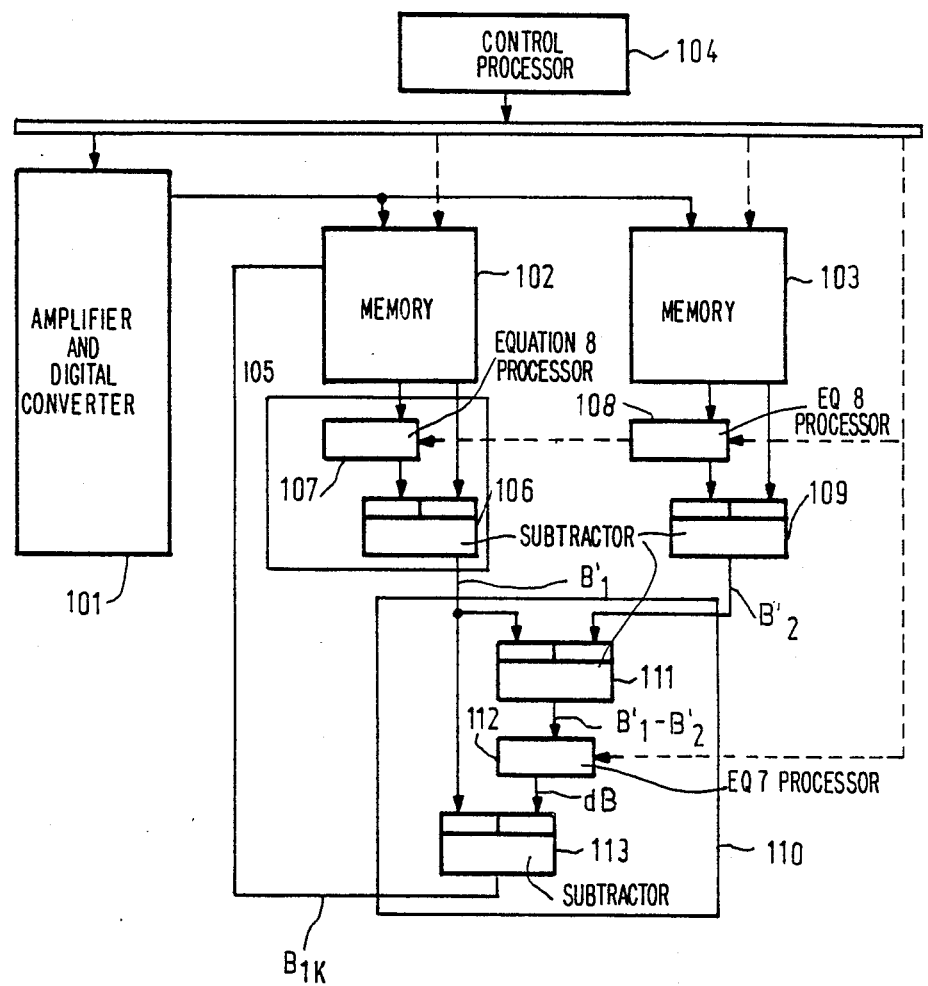

FIG. 3 shows the relationship between the image value and the dose in the case of a photoconductor, FIG. 4 shows the variation over time of the surface potential in the case of an X-ray exposure influenced by the memory effect, FIG. 5 shows the progression over time of the image values in the case of X-ray exposures with varyingly strong levels of illumination and FIG. 6 shows the block circuit diagram of a unit which can evaluate the image values in the way according to the invention.

Figure 1:
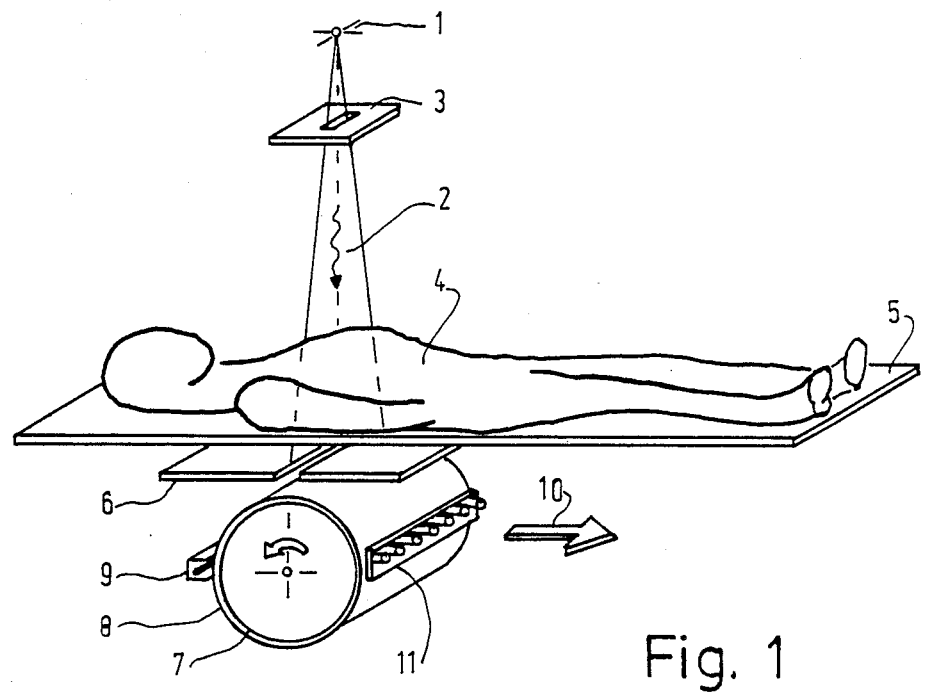
FIG. 1 shows an X-ray device to which the invention can be applied.

In FIG. 1, 1 diagrammatically indicates an X-ray emitter which emits a cone of rays 2, which is converted by a diaphragm plate 3, provided with a slot, into a plane fan of rays and passes through a patient 4, who is lying on a patient positioning table 5. On the other side of the table 5, the cone of rays 2 passes through another diaphragm 6 and reaches an image recorder, which comprises a cylindrical carrier 7, on the surface of which a photoconductor layer 8, preferably of selenium, has been applied. The electrically conducting carrier 7 is connected to a negative direct voltage, for example to −1,500 V.

Before the beginning of an X-ray exposure, the photoconductor layer 8 is charged to zero volt by a charging means 9 parallel to the cylinder axis, so that there is a voltage of 1,500 V over the photoconductor layer. The charging, which is performed with carrier 7 rotating, is interrupted immediately before an X-ray exposure. In the X-ray exposure, the carrier likewise rotates and is displaced in the direction of the arrow 10. During the course of an X-ray exposure, the entire surface of the photoconductor layer 8 is gradually illuminated and, depending on the intensity of the X-radiation, discharged to a greater or lesser extent at the various points. The charge densities at the surface or the surface potential, which represent a measure of the intensity of the X-radiation, are scanned after the exposure—likewise with the drum rotating—by an electrostatic induction probe arrangement 11 and converted into electric signals. These signals, proportional to the surface potential and the discharge after the exposure, are amplified by circuit components (not shown in any more detail) and converted into digital data words. These data words represent in digital form a number which describes the surface potential and the discharge at the point of concern of the photoconductor layer 8 and is a measure of the intensity of the X-radiation at the image point concerned. That number is therefore referred to hereinafter as image value.

Such an arrangement is described in detail in German Offenlegungsschrift No. 3,534,768. Instead of a recording carrier with cylindrical surface, however, a flat recording carrier may also be used, which is illuminated everywhere at the same time and the surface potential of which is detected by a meandering scanning movement.

Figure 2:
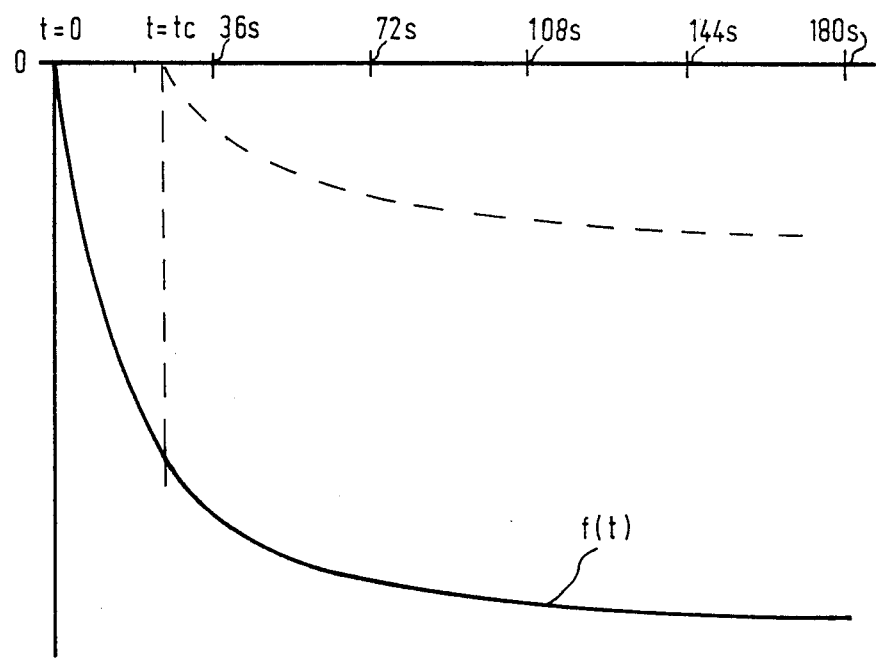
FIG. 2 shows the characteristic discharge curve of a photoconductor.

In FIG. 2, the curve f(t) represented by a solid line represents the variation over time of the surface potential in the case of a photoconductor which has been exposed to an X-radiation and simultaneously charged at the time $t=0$. A part of the charge carriers produced by the X-ray illumination is captured in traps in the photoconductor. These charge carriers are thermally freed at a later time. They drift under the influence of the electric field prevailing in the photoconductor layer 8 perpendicularly to the photoconductor surface and bring about a discharge. This discharge is relatively strong immediately following the X-ray exposure and dies down within a few minutes.

It is clear from the above that the memory effect can only play a part as long as the charge carrier movement triggered by the preceding X-ray exposure has not yet died down. If, however, the next exposure only takes place after a considerable span of time, for example after more than three minutes, the memory effect virtually no longer makes itself noticeable. If the self-discharge brought about by the memory effect is compared with the discharge brought about by the current exposure, it is found that the memory effect is primarily effective in direct radiation areas of the preceding exposure and overlaps there with diagnostically relevant image areas of the current exposure. Due to the small dose in these image areas in the current exposure in comparison with direct radiation, the memory effect may predominate here. The direct radiation areas of the current exposure are of little diagnostic interest, which facilitates the correction in the presence of these effects. If the charging of the photoconductor layer 8 were not to end already at the time $t=0$ but only at the time $t=t_c$, this would have virtually no influence on the charge carrier movement. The discharge curve which is produced when the charging is not switched off until the time $t=t_c$ (represented by broken lines) therefore differs from the curve f(t) only by a constant amount.

If the variation of the surface potential is measured in a corresponding way for a greater or smaller dose, although greater or smaller values are obtained, the curves are the same apart from a constant amplitude factor. Consequently, the following applies for the variation over time of the surface potential dB(x,y,t) in the case of self-discharge $$db(x,y,t) = k(x,y)f(t) \tag{1}$$

where f(t) is the progression represented in FIG. 2 and k(x,y) is the amplitude factor. It emerges from equation (1) that the surface potential, a variable which depends on the locus x,y and on time, can be calculated from the product of a locus-dependent factor k(x,y) and a time-dependent factor f(t).

As already explained, the amplitude factor k is dependent on the dose, to be precise, the greater the amplitude, the greater the dose. At least with smaller doses, the factor k is linearly related to the dose. Since, for its part, the dose determines the discharge of the photoconductor, a clear relationship is also obtained between the image value B at an image point and the factor k, which describes the following self-discharge at this image point according to equation (1).

This relationship is represented in FIG. 3. It can be seen that the amplitude factor k at first increases linearly with the image value B and that, with increasing B, the increase of k becomes larger. The curve represented in FIG. 3 can be measured for instance as follows:

First of all the variation over time of the self-discharge is measured for a suitably selected dose or the associated image value. This variation is defined as characteristic discharge function f(t) (FIG. 2). The image value B concerned is assigned the amplitude factor $k=1$. Thereafter, the dose is varied, and again the change in surface potential occurring after the irradiation is measured. As already mentioned, the variation over time of this self-discharge differs from the previously measured curve f(t) only by a constant factor, which can be determined from a comparison of the curves. This factor is assigned to the image value B given in the measurement. This procedure is repeated for a number of image values B, so that the curve according to FIG. 3 is obtained.

If the relationship between B and k is known, the self-discharge dB can be calculated for each image point according to the equation $$dB = k * (f(t_1) - f(t_c)) \tag{2}$$

where it is assumed that the preceding exposure ended at the time $t=0$, that the charging of the photoconductor layer 8 was ended before the current exposure at the time $t=t_c$ and that the image value concerned has been detected in the current image at the time $t=t_1$. The amplitude factor k is determined from the image value in the preceding exposure (at the time $t=0$). The image value determined in the current exposure must consequently be reduced by dB. Carrying out the method with a computer is conditional on the curves according to FIGS. 2 and 3 being known and stored. Since the amplitude factor k, generally different for different image points, depends only on the associated image values in the preceding exposure, it can already be determined for each individual image point immediately after the preceding exposure. The values $t_1$ and $t_c$, on the other hand, are not established until after the following exposure, meaning that the difference in equation (2) can only be calculated thereafter. The instant $t_c$ and $f(t_c)$ is in this case constant for all image points. On the other hand, $t_1$, and consequently $f(t_1)$, are not equal for all image points, because the surface potential at the various image points is generally detected at different instants.

The correction of the memory effect explained above utilizes image values which were obtained in the preceding exposure. It is also possible, however, to take the values necessary for the correction only from the current exposure, for which the memory effect brought about by the preceding exposure is to be compensated or corrected. If the photoconductor is namely scanned at two different instants $t_1$ and $t_2$ following an exposure, two different image values $B_1$ and $B_2$ are obtained for this image point. The image value $B_2$ detected at the later instant $t_2$ is in this case greater than $B_1$, because the self-discharge at the instant $t_2$ has progressed further than at the instant $t_1$. The greater the dose was at the image point concerned in the preceding exposure, and the shorter the span of time from this exposure, the greater the difference between $B_2$ and $B_1$. Consequently, the strength of the memory effect can be derived from the difference between $B_2$ and $B_1$ and the image values can be corrected correspondingly.

To explain this idea, reference is made below to FIG. 4.

FIG. 4 shows the variation over time of the surface potential of an image point in an X-ray exposure, it being assumed that the preceding exposure took place at the time $t=0$. The associated discharge function $f(t)$ is indicated by a broken line in FIG. 4. It is assumed that, after this preceding exposure, the surface of the photoconductor layer 8 is first of all charged and remains charged up until the instant $t=t_c$. The self-discharge then occurring may have the same progression as the characteristic discharge curve $f(t)$ from the instant $t_c$ onwards; however, it may also be more or less pronounced, depending on the dose by which the associated image point was affected in the preceding exposure.

At the time $t=t_b$, the image point is again illuminated with X-radiation. During the X-ray exposure, the surface of the photoconductor layer 8 discharges by the amount $B_r$. This amount, which—just like the self-discharge—may vary from image point to image point, contains the actual image information.

After the X-ray exposure, the self-discharge of the photoconductor layer 8 continues, and, at the time $t=t_1$, the photoconductor surface is scanned. The image value obtained in this case for the image point is denoted by $B_1$. The charge distribution at the surface of the photoconductor layer 8 cannot be scanned simultaneously everywhere, but within a few seconds, as indicated by the shaded strips. The charge distribution is not altered by the scanning or reading-out it is only made to change by the self-discharge process described.

At the time $t=t_2$, a renewed scanning operation of the photoconductor layer 8 surface begins. The image value thereby obtained is denoted by $B_2$. Due to the progressed self-discharge in the meantime, it is greater than $B_1$.

The following applies for the self-discharge at the instant $t_1$:

$$dB_1 = k * f(t_1) + C \quad (3)$$

where C is a constant which corresponds to the product of the factor k and the characteristic discharge function at the time $t=t_c$. By analogy, the following is obtained for the self-discharge $dB_2$ at the instant $t_2$:

$$dB_2 = k * f(t_2) + C \quad (4)$$

As already mentioned, the difference between the two image values of an image point is attributable exclusively to the self-discharge of the photoconductor layer 8 at this image point. Consequently, and in consideration of the equations (3) and (4), the following applies:

$$B_1 - B_2 = dB_1 - dB_2 = k * (f(t_1) - f(t_2)) \quad (5)$$

This equation can be solved for k, yielding the following:

$$k = (B_1 - B_2)/(f(t_1) - f(t_2)) \quad (6)$$

If this value of k is entered in equation (2), the following is obtained for the self-discharge dB up to the scanning instant $t_1$ $$dB = (B_1 - B_2) * (f(t_1) - f(t_c))/(f(t_1) - f(t_2)) \quad (7)$$

The values $B_1$ and $B_2$ are obtained from the double scanning. The characteristic discharge function $f(t)$ is known from the outset, and the instants $t_c$, $t_1$ and $t_2$ are obtained by measurement of the span of time between the preceding exposure and the end of the charging or the scanning instants $t_1$ and $t_2$.

In the case of an X-ray device, the time sequence of an X-ray exposure always proceeds by the same sequence of events. So when the charging is switched off for preparation of the X-ray exposure, and consequently the instant $t=t_c$ is fixed, the instants $t_1$ and $t_2$ are also established, because the scanning of a certain image point always takes place with the same span of time from the introduction of the X-ray exposure. Consequently, the values $t_1$ and $t_2$ and $f(t_1)$ and $f(t_2)$ are already established for each image point before the instants $t_1$ and $t_2$ and can be used for the calculation of dB. The thus-calculated value dB then only has to be subtracted from the image value $B_1$.

It was assumed above that the self-discharge is caused exclusively by the memory effect, i.e. that it is induced by the surface having been affected in some places by particularly strong radiation (direct radiation) in the preceding (at the instant $t=0$) exposure and therefore discharges particularly quickly. Apart from this cause, there is a further cause for the self-discharge in the radiation dose received in the current X-ray exposure ($t=t_b$). With a correct illumination, this radiation dose is comparatively small—in any event in the areas important for the diagnosis, so that the artifacts caused thereby do not assume the same extent as they could achieve as a consequence of the memory effect. However, the self-discharge follows the same laws, which were explained—for the memory effect—in conjunction with FIG. 2 and equation 1. The only difference is that the amplitude factor is significantly smaller and that the period of time between the exposure and the scanning instant is shorter than the period of time between the preceding exposure and this instant.

For that reason, it is not necessary to carry out the procedure carried out with reference to equations (2) to (7) for the correction of this component of the self-discharge. Rather, a correction in which a linear change over time in the surface potential is assumed suffices, meaning that the variable can be determined directly from the image amplitude. Reference is made in this respect to FIG. 5, which indicates the variation over time of the surface potential for three different image points which are affected by varyingly strong X-radiation at the time $t = t_b$. The associated self-discharge curves are denoted by $B_a$, $B_b$ and $B_c$. The following can be seen from this:

The discharge curves can be replaced by straight lines, which are indicated in FIG. 5 by broken lines. The slopes of these straight lines are proportional to the image value which established itself at the end of the exposure ($t = t_b$). Consequently, the following applies for the discharge dB of an image point at the time t $$dB = B * c_1 * (t - t_b) \qquad (8)$$

where B is the image value which was measured at the time t and $c_1$ is a material constant. The measured image value B must be reduced by the thus-determined amount dB. This correction is not only necessary for improving the correction of the memory effect but can be used with advantage independently of this also in the case of X-ray exposures in which the memory effect does not play any part (for example because the span of time from the preceding X-ray exposure is sufficiently great).

In FIG. 6, the block circuit diagram of an image processing unit is represented, with which the corrections explained above can be carried out. The unit 101 amplifies the electric signals supplied by the probes 10 (FIG. 1) and converts them into digital image values. The unit 101 consequently supplies a sequence of image values. In the first scanning, these image values are fed to a memory 102 and, in the second scanning, to an image memory 103. Each of the memories thus contains the complete X-ray exposure—albeit affected by artifacts due to the self-discharging effects described. The components 101, 102, 103 and all of the other components of the image processing unit are controlled by a control processor 104. This control processor registers the instant of each X-ray exposure and determines the period of time which elapses between the preceding exposure to the instant $t_c$ at which the charging of the photoconductor is switched off for the preparation of the current exposure. The control processor 104 also contains, in a memory, the characteristic discharge function f(t) and can consequently produce this variable at the various instants, or values derived therefrom.

The correction of the self-discharge, explained in conjunction with equation (8), is carried out in a unit which comprises an adder or subtractor 106, to which the respective image value is fed on the one hand directly and on the other hand via a unit 107, which forms the product according to equation (8). This unit may either be a multiplier, which multiplies the image value by the factor $c_1(t - t_b)$, or else a look-up table into which a data record is read by the control processor 104, which record is created in such a way that, if the image value B is entered at the input of the unit 107, the product according to the equation (8) appears at its output. This is the value dB of the self-discharge induced by the current exposure up to the instant t. Consequently, an image value which is independent of the current exposure is obtained at the output of the unit 106. This image value is denoted by $B_1'$.

In analogy with this pre-correction of the image values arising in the first scanning operation, the image values which arose in the second scanning operation (at the instant $t_2$ and later) and are stored in the memory 103 are pre-corrected. This purpose is served by a unit 108, which produces a product according to equation (8), as well as the adder or subtractor 109, at the output of which a signal consequently occurs which corresponds to the image value $B_2'$ in the second scanning—freed of the self-discharge effect induced by the current exposure. The control processor 104 controls the read-out of the image values from the memories 102 and 103 in such a way that in each case the image values which are assigned to the same image point are read out.

The image values $B_1'$ and $B_2'$ pre-corrected in this way are fed to a unit 110, in which the discharge brought about by the memory effect is corrected. For this purpose, it contains a subtractor 111 which forms the difference between $B_1'$ and $B_2'$ and the output of which is connected to the input of a unit 112, the output signal of which corresponds to the product of the input signal mentioned and the factor $$(f(t_1) - f(t_c))/(f(t_1) - f(t_2)).$$

The unit 112 can thus in turn be a multiplier or a look-up table, in which the associated product for each input value ($B_1' - B_2'$) is stored. The digital value at the output of the unit 112 consequently corresponds to the value dB according to equation (7), i.e. it represents the self-discharge which has arisen due to the memory effect up to the instant $t_1$. This value is subtracted from the precorrected image value $B_1'$ in a subtractor 113. The output signal $B_{1k}$ consequently represents the image value freed of self-discharge effects induced by the preceding exposure and by the current exposure; it thus corresponds to the value $B_r$ determined by the image information. The signal $B_{1k}$ is stored in the memory 102 at the memory location from which previously the image value $B_1$ was taken.

In this way, the exposure contained in the memory 102, which at first is affected by artifacts due to the self-discharge effects, is corrected image point by image point. Since the other image values are generally not obtained at the time $t_1$, $t_2$ but at other instants, the factors used for multiplication in the units 107, 108 and 112 must be continuously adapted (the parameter t in equation (8), which is carried out by means of the components 106 ... 109, corresponds to the scanning instants at which a certain image point is scanned, meaning that the factor likewise has to be changed for the units 107 and 108). Since neighbouring image points on the photoconductor can be scanned in extremely short intervals, it suffices if the image points which are scanned within a period of time within which the self-discharge is negligible (for example 0.1 sec) are assigned the same scanning point. Thus, in the case of the arrangement according to FIG. 1, for example, all of the image points of which the charge density is scanned by the electrostatic induction probe arrangement 11 within one revolution of the carrier 7 can be assigned the same scanning instant. As a result, the quality of the correction of the self-discharge effects is not significantly influenced, but the amount of calculation for the control processor 104, which in each case has to recalculate the factors dependent on the time or on the characteristic discharge function f(t), is significantly reduced.

What is claimed is:

1. Method of producing an X-ray image by means of a photoconductor layer which has a characteristic discharge function, which tends to self-discharge causing artifacts in the image, which converts X-radiation into a charge pattern, is evenly charged locally before the X-ray exposure, is discharged by the exposure as a function of the intensity of the X-radiation and the surface of which is scanned after the exposure for detecting the charge density, an image value being formed for each image point corresponding to the discharge at the image point, said method comprising: determining the self-discharge (dB) at each image point from the time elapsed since a preceding exposure up to the end of the charging or until reading-out, from the characteristic discharge function (f(t)) of the photoconductor and from a correction factor (k) dependent on the dose at each image point in the preceding exposure; and correcting the associated image value ($B_1$) produced by said charge pattern for the effect of said self-discharge (db) on said image value ($B_1$).

2. Method according to claim 1 further including the step of deriving the correction factor (k) from the image values of the preceding exposure.

3. Method according to claim 1 including scanning the discharge image produced by an X-ray exposure twice and determining the correction factor from the difference ($B_1-B_2$) between the image values of the successive twice scanned images corresponding to the difference between the characteristic discharge function f(t) at the two scanning instants ($t_1$, $t_2$).

4. Method of claim 1 including the step of reducing the image values ($B_1$) by an amount (dB) which is proportional to the image values and the time difference ($t-t_b$) between a scanning instant and a reference instant, preferably the instant ($t_b$) of the exposure, for correction of the discharge brought about by the respective exposure.

5. Apparatus for producing an X-ray exposure by means of a photoconductor layer which tends to self-discharge with a characteristic function and which converts X-radiation into a charge pattern, is evenly charged locally before the X-ray exposure, is discharged by the exposure as a function of the intensity of the X-radiation and the surface of which is scanned after the exposure for detecting the charge density, an image value being formed for each image point corresponding to the discharge at that image point, said image tending to include artifacts caused by said self-discharge, said apparatus comprising:

a photoconductor layer on a conducting carrier;

an electrometer for detecting the charge density at individual points of the photoconductor layer;

memory means for storing the image values proportional to the charge density, said memory means including first means for storing the image values of successive X-ray exposures and second means for storing values representing the characteristic discharge function;

first processing means responsive to said stored image values and stored discharge values for determining the self-discharge of the photoconductor layer taking place after the end of exposure at various image points from the values contained in the first and second means; and second processing means responsive to the determined self-discharge for correcting the image values of said image for the effects of said self-discharge to substantially alleviate said artifacts.

6. Apparatus according to claim 5, wherein said first means includes means for multiplying the image values by a factor proportional to the time difference between the scanning of the associated image point and the reference instant and means for the subtraction of the product thus produced from the associated image value.

* * * * *